United States Patent
Hsieh

(10) Patent No.: US 7,589,503 B2
(45) Date of Patent: Sep. 15, 2009

(54) RECHARGING APPARATUS CAPABLE OF SELECTIVELY ENABLING OR INTERRUPTING RECHARGING PROCEDURE FOR RECHARGEABLE BATTERY IN PORTABLE ELECTRONIC DEVICE AND RECHARGING METHOD THEREOF

(75) Inventor: Chin-Hsien Hsieh, Taipei (TW)

(73) Assignee: ASUSTeK Computer Inc., Peitou, Taipei (TW)

( * ) Notice: Subject to any disclaimer, the term of this patent is extended or adjusted under 35 U.S.C. 154(b) by 334 days.

(21) Appl. No.: 11/499,707

(22) Filed: Aug. 7, 2006

(65) Prior Publication Data

US 2007/0035277 A1 Feb. 15, 2007

(30) Foreign Application Priority Data

Aug. 9, 2005 (TW) .............................. 94127015 A

(51) Int. Cl.
*H02J 7/04* (2006.01)
*H02J 7/16* (2006.01)
(52) U.S. Cl. ...................... 320/149; 320/114
(58) Field of Classification Search ................. 320/112, 320/113, 114, 115, 137, 149
See application file for complete search history.

(56) References Cited

U.S. PATENT DOCUMENTS 6,950,320 B2 * 9/2005 Shin ........................ 363/21.15
2002/0149345 A1 * 10/2002 Takano et al. ............... 320/137

FOREIGN PATENT DOCUMENTS

TW 234788 11/1994
WO 02/073336 9/2002

* cited by examiner

*Primary Examiner*—Edward Tso
*Assistant Examiner*—Ramy Ramadan
(74) *Attorney, Agent, or Firm*—Winston Hsu

(57) ABSTRACT

A recharging apparatus applied to a portable electronic device. The recharging apparatus is capable of selectively enabling or interrupting the recharging procedure for a rechargeable battery in the portable electronic device. The recharging apparatus includes an input unit, a recharging circuit, and a control unit. The input unit is applied to generate a switching control signal; the recharging circuit is applied to receive an enable signal and then output recharging power used for recharging the rechargeable battery; and the control unit, electrically connected to the input unit and the rechargeable battery, is applied to determine whether to output the enable signal to the recharging circuit or not in accordance with the switching control signal.

12 Claims, 2 Drawing Sheets

RECHARGING APPARATUS CAPABLE OF SELECTIVELY ENABLING OR INTERRUPTING RECHARGING PROCEDURE FOR RECHARGEABLE BATTERY IN PORTABLE ELECTRONIC DEVICE AND RECHARGING METHOD THEREOF

BACKGROUND OF THE INVENTION

1. Field of the Invention

The present invention relates to a recharging apparatus and a recharging method thereof, and more specifically, to a recharging apparatus that enables or interrupts recharging procedures for a rechargeable battery in a portable electronic device and a recharging method thereof.

2. Description of the Prior Art

The tide of electronic devices turning towards smaller and lighter devices has resulted in portable electronic devices, such as mobile phones and personal digital assistants (PDAs), appearing more and more frequently in daily life. In practical terms of using portable electronic devices, a main point of evaluating convenience of said portable electronic devices is power management. In general, portable electronic devices are equipped with rechargeable batteries: when a portable electronic device does not employ an external power source, such as power supplied by a power plant, the rechargeable battery is responsible for supporting all consumed power of the portable electronic device. When the portable electronic device connects to an external power source, an internal power control circuit of the portable electronic device switches the power source from the rechargeable battery to the external power source. At such a time, the external power source not only supplies sufficient power to the portable electronic device for normal operation, but also enables recharging procedures for the rechargeable battery to replenish consumed energy of the rechargeable battery until the portable electronic device disconnects from the external power source.

As mentioned above, current portable electronic devices always enable recharging procedures for the rechargeable battery inside the device when the portable electronic device is connected to an external power source, no matter whether the rechargeable battery is filled up or not. Unfortunately, the number of times the battery can be recharged is limited, regardless of whether the battery is a Li-ion battery or a Ni—Mh battery. If the number of recharging times is over the limit (for example, a Li-ion battery is usually designed to support 800 or 1000 recharges), the efficiency of the rechargeable battery is greatly decreased. That is, the rechargeable battery is only allowed to be recharged a fixed number of times, and if the number of recharging times is over the limit, the rechargeable battery cannot be recharged anymore. Because the battery has no ability to continue supplying power required by the portable electronic device, a new battery is required. It is well known that a traditional recharging apparatus and control method thereof reduce rechargeable battery life due to bad recharging mechanisms, and unnecessary costs are introduced as a result of more frequent replacement for rechargeable batteries inside a portable electronic device.

SUMMARY OF THE INVENTION

It is therefore one of the objectives of the claimed invention to provide a recharging apparatus and a recharging method capable of selectively enabling or interrupting recharging procedures for a rechargeable battery in the portable electronic device. The present invention considers utilizing circumstance and remaining energy of the battery to determine whether to recharge the rechargeable battery, to solve the above-mentioned problems.

According to the claimed invention, a recharging apparatus applied to a portable electronic device is disclosed. The recharging apparatus is capable of selectively enabling or interrupting the recharging procedure for a rechargeable battery in the portable electronic device. The recharging apparatus includes an input unit, a recharging circuit, and a control unit. The input unit generates a switching control signal; the recharging circuit receives an enable signal and then outputs a recharging power used for recharging the rechargeable battery; where the control unit is electrically connected to the input unit and the recharging circuit, for determining whether to output the enable signal to the recharging circuit in accordance with the switching control signal.

According to the claimed invention, a recharging method applied to a portable electronic device is further disclosed. The recharging method is capable of selectively enabling or interrupting the recharging procedure for a rechargeable battery in the portable electronic device. The recharging method includes generating a switching control signal; determining whether to output an enable signal to a recharging circuit in accordance with the switching control signal; and receiving the enable signal then outputting a recharging power used for recharging the rechargeable battery.

The present invention, the recharging apparatus and the recharging method permit users to decide whether to enable recharging procedures for a rechargeable battery. In the claimed invention, this is achieved by generating a switching control signal through an input unit (such as a hardware switch) to control an internal recharging circuit of the portable electronic device. On the other hand, when the remaining energy of the rechargeable battery is sufficient so no recharging procedures are required, the recharging apparatus and the recharging method automatically interrupt recharging procedures. Consequently, unnecessary recharges for the rechargeable battery are decreased: that is, life of the rechargeable battery is greatly increased by applying the recharging apparatus and the recharging method disclosed in the present invention.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
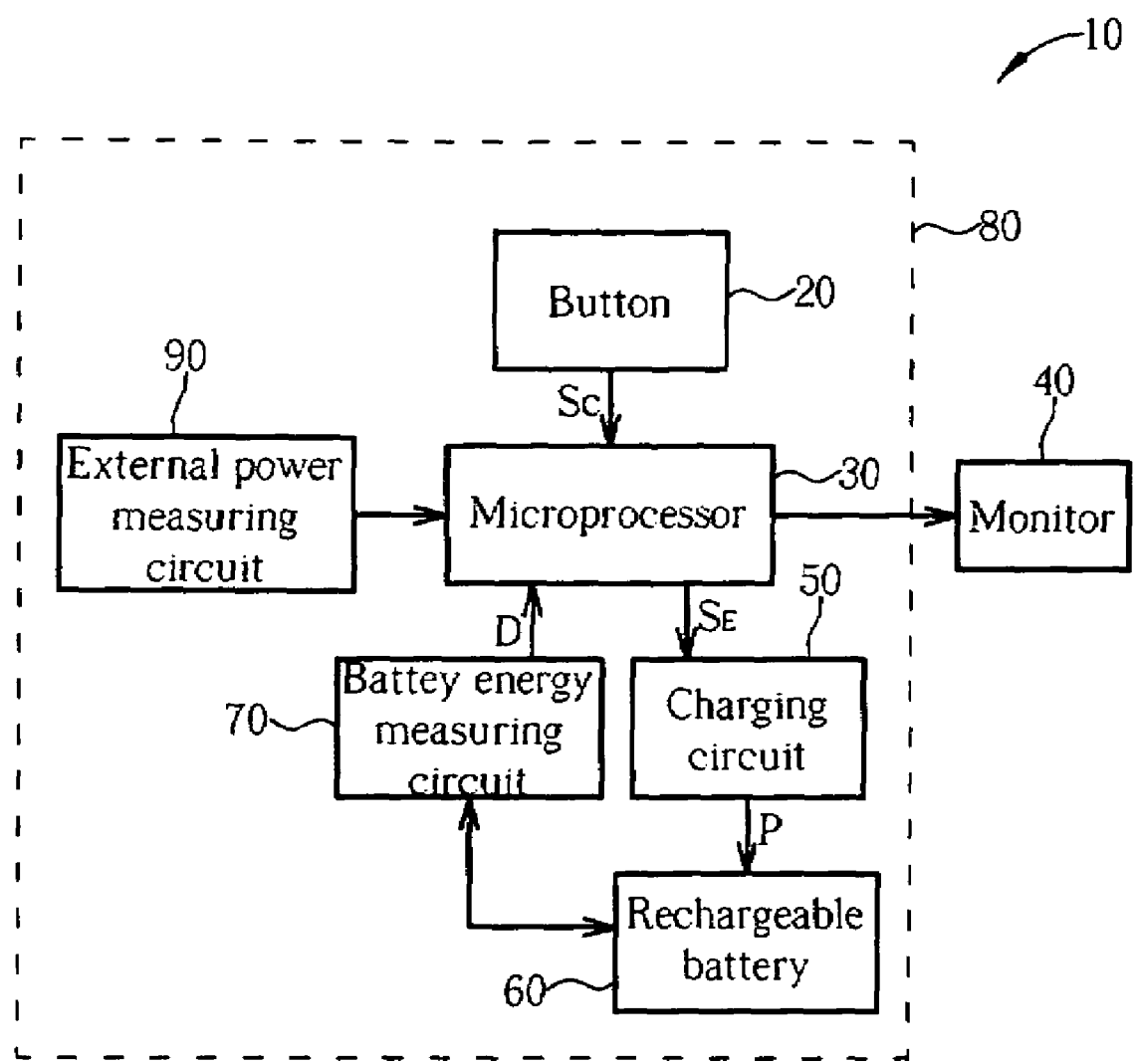
FIG. 1 is a diagram of a recharging apparatus applied to a mobile phone according to an embodiment of the present invention.

The present invention, the recharging apparatus, is mainly applied to a portable electronic device. Taking a mobile phone for example, please refer to FIG. 1. FIG. 1 is a diagram of a recharging apparatus 80 applied to a mobile phone 10 according to an embodiment of the present invention. For clarity and briefness of discussion, only elements related to the invention are shown in FIG. 1. The following discussion describes elements related to the invention. The mobile phone 10 shown in FIG. 1 includes a recharging apparatus 80, electrically connected to a monitor 40, for transferring power management data to the monitor 40, such as status of the rechargeable battery (for example, remaining energy) and a power source of the mobile phone 10 (for example, an external or an internal power source). Therefore, users realize current power status of the mobile phone 10 through information shown on the screen 40. Additionally, the recharging apparatus 80 includes a button 20, a microprocessor 30, a recharging circuit 50, a rechargeable battery 60, a battery energy measuring circuit 70 and an external power measuring circuit 90. The button 20 is utilized as an input unit, for generating a switch control signal $S_C$. The microprocessor 30 is utilized as a control unit, electrically connected to the button 20 and the recharging circuit 50, for determining whether to output an enable signal $S_E$ to the recharging circuit 50 according to the switch control signal $S_C$. The recharging circuit 50 is utilized to supply recharging power P, where after receiving the enable signal $S_E$, the recharging circuit 50 outputs the recharging power P to recharge the rechargeable battery 60. The rechargeable battery is utilized to supply required power for normal operation of the mobile phone 10. The battery energy measuring circuit 70, electrically connected to the microprocessor 30 and the rechargeable battery 60, is utilized for measuring remaining energy of the rechargeable battery 60 and outputting a measure value D to the microprocessor 30, enabling the microprocessor 30 to determine whether to output the enable signal $S_E$ according to the measure value D. The external power measuring circuit 90, electrically connected to the microprocessor 30, is utilized to detect whether the mobile phone 10 connects to an external power source. In this embodiment, the recharging apparatus 80 is capable of selectively enabling or interrupting recharging procedures for the rechargeable battery 60 in the mobile phone 10. The operation principle is described as follows.

Considering that the mobile phone 10 disconnects from an external power source, operation power is supplied by the rechargeable battery 60. As time goes on, energy of the rechargeable battery 60 is decreased. The battery energy measuring circuit 70 monitors remaining energy of the rechargeable battery 60 and outputs a measure value D to the microprocessor 30 corresponding to the remaining energy of the battery. Next, the microprocessor 30 displays the information on the monitor 40. When the mobile phone 10 connects to an external power source, the external power measuring circuit 90 generates a signal to notify the microprocessor 30, and then the power source of the mobile phone 10 is switched to the external power source, so the rechargeable battery 60 stops to consume remaining energy stored inside the rechargeable battery 60. Furthermore, the button 20 is able to generate the switch control signal $S_C$ to inform the recharging apparatus 80 to enable or interrupt recharging procedures for the recharging apparatus 80. If the rechargeable battery 60 requires recharging, the switch control signal $S_C$ is generated through the button 20 to inform the microprocessor 30 to output the enable signal $S_E$ to the recharging circuit 50. After receiving the enable signal $S_E$, the recharging circuit 50 transforms the external power into recharging power P and enables recharging procedures for the rechargeable battery 60. On the other hand, if the rechargeable battery 60 does not require recharging, the switch control signal $S_C$ is similarly generated through the button 20 to inform the microprocessor 30, but in this case the microprocessor 30 does not output the enable signal $S_E$ to the recharging circuit 50, therefore, the recharging circuit 50 interrupts recharging procedures for the rechargeable battery 60. More clearly, input of the button 20 determines the switch control signal $S_C$ and whether or not the microprocessor 30 outputs the enable signal $S_E$ to the recharging circuit 50. If the microprocessor 30 outputs the enable signal $S_E$ to the recharging circuit 50, the recharging apparatus 80 enables recharging procedures for the rechargeable battery 60. If the microprocessor 30 does not output the enable signal $S_E$ to the recharging circuit 50, the recharging apparatus 80 does not enable recharging procedures for the rechargeable battery 60.

As mentioned above, the recharging apparatus 80 of the embodiment decides whether to recharge the rechargeable battery 60 inside the mobile phone 10 through the button 20. In an actual circumstance, however, when remaining energy of the rechargeable battery 60 is low and the button 20 is still set in status of interrupting recharging procedures, although the mobile phone 10 connects to an external power source, the recharging apparatus 80 will not recharge the rechargeable battery 60. Because the external power source interrupts the supply of power to the mobile phone 10, the mobile phone 10 has to continually use energy stored in the rechargeable battery 60 to maintain operation. This will probably cause the mobile phone 10 to exhaust all remaining energy of the rechargeable battery 60, resulting in undesired shut down, so life of the rechargeable battery 60 is reduced. To avoid this, when remaining energy of the rechargeable battery 60 is low, the recharging apparatus 80 must ignore a current setting of the button 20 and force enabling recharging procedures for the rechargeable battery 60. Please refer to FIG. 1. The battery energy measuring circuit 70 periodically detects remaining energy of the rechargeable battery 60 and outputs a measure value D to the microprocessor 30 corresponding to the remaining energy. The microprocessor 30 compares the measure value D and a predetermined threshold value. If the measure value D is smaller than the threshold value, the microprocessor 30 ignores the switch control signal $S_C$ and forces outputting of the control signal $S_E$ to the recharging circuit 50. Therefore, when the recharging apparatus 80 connects to the external power source, although the button 20 is set to interrupt charging procedures, the recharging apparatus 80 will still continuously recharge the rechargeable battery 60, therefore avoiding exhausting remaining energy of the rechargeable battery 60.

Please note that although the embodiment takes the mobile phone 10 as an example, the recharging apparatus 80 is capable of being applied to other well-known portable electronic devices, such as notebook PCs. In other words, the claimed invention recharging apparatus can be applied to any electronic device that uses rechargeable batteries. The mobile phone 10 in the embodiment utilizes an existing microprocessor 30 as the control unit for processing control procedures related to power management. Furthermore, it is acceptable to replace the microprocessor 30 with an independent control chip or an additional circuit set. Moreover, the embodiment utilizes the button 20 as the input unit, but it is also acceptable to replace the button 20 with other switch devices (such as a knob or a push rod), even when utilizing software (human machine interface) installed in the mobile phone 10 to replace the hardware switch. In this situation, users set the switch control signal $S_C$ through software to control the recharging apparatus 80 to enable or interrupt recharging procedures for the rechargeable battery 60 in the mobile phone 10. For example, users set software to force the recharging apparatus 80 to recharge the rechargeable battery 60 if the remaining energy of the rechargeable battery 60 is less than ten percent.

Additionally, in the mobile phone 10 of the embodiment, the major function of the button 20 is for generating the switch control signal $S_C$, but in fact, the button 20 is not necessary, and can be replaced by the battery energy measuring circuit 70. The battery energy measuring circuit 70 detects remaining energy of the rechargeable battery 60 and then generates the switch control signal $S_C$ according to the amount of remaining energy. A threshold value is set in advance, and if remaining energy of the rechargeable battery 60 is larger than the threshold value, the battery energy measuring circuit 70 does not generate the switch control signal $S_C$; similarly if remaining energy of the rechargeable battery 60 is less than the threshold value, the battery energy measuring circuit 70 generates the switch control signal $S_C$.

Figure 2:
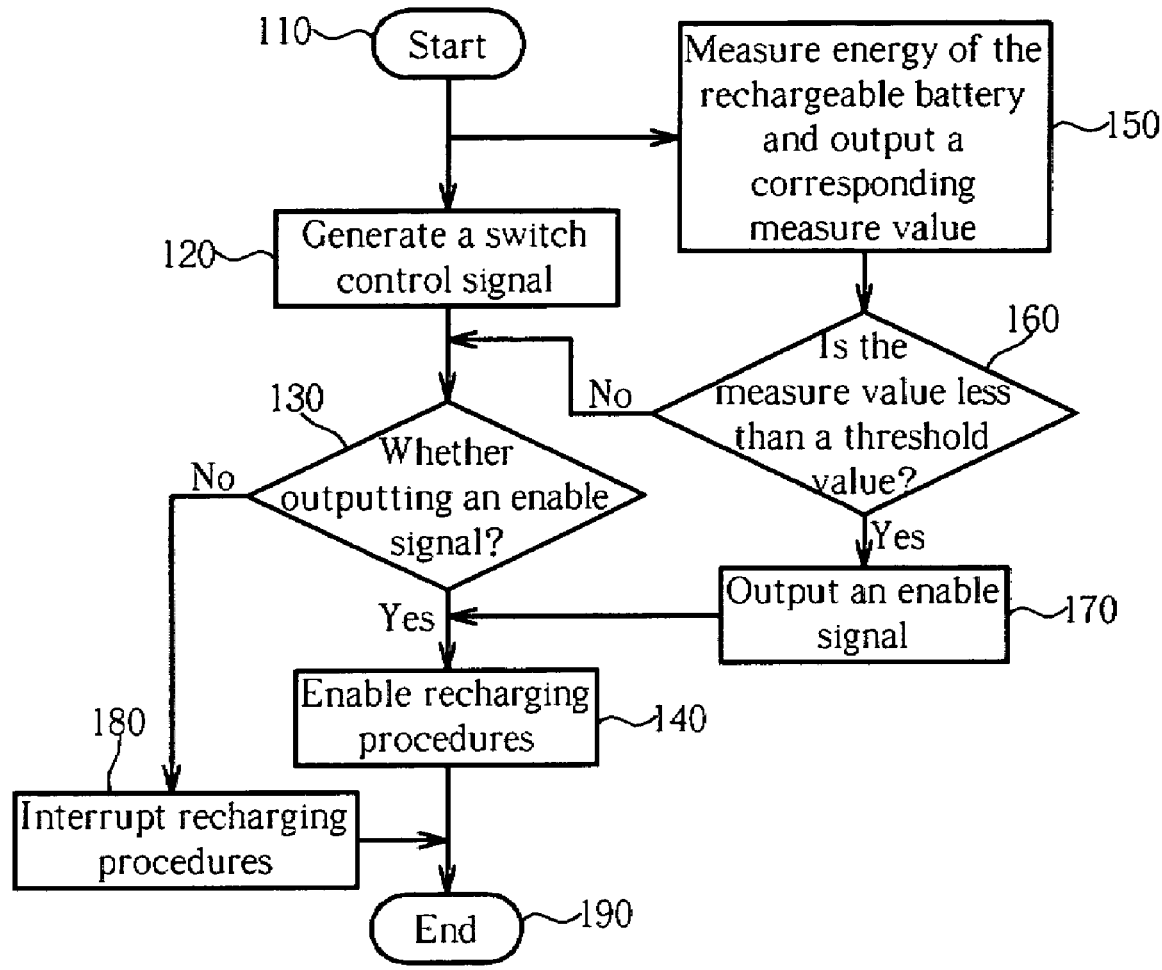
FIG. 2 is a flowchart of the recharging method that enables recharging procedures for the rechargeable battery according to the present invention.

Please refer to FIG. 2. FIG. 2 is a flowchart of the recharging method that enables recharging procedures for the rechargeable battery 60 according to the present invention. The recharging method selectively enables or interrupts recharging procedures for a rechargeable battery in a portable electronic device. The flow includes the following steps:

Step 110: start;

Step 120: generate a switch control signal $S_C$ through the button 20;

Step 130: the microprocessor determines whether to output an enable signal $S_E$ to the recharging circuit 50 according to the switch control signal $S_C$; if YES, go to step 140; if NO, go to step 180;

Step 140: enable recharging procedures; the recharging circuit 50 outputs recharging power P to refill the recharging battery 60; go to step 190;

Step 150: the battery energy measuring circuit 70 detects remaining energy of the rechargeable battery 60 and outputs a measure value D corresponding to the remaining energy;

Step 160: the microprocessor 30 determines whether the measure value is less than a preset threshold value; if YES, go to step 170; if NO, jump to step 130;

Step 170: the microprocessor 30 outputs the enable signal $S_E$ to the recharging circuit 50; go to step 140;

Step 180: interrupt recharging procedures, so the recharging circuit 50 stops outputting recharging power P;

Step 190: end.

As mentioned above, in the present invention, a recharging apparatus and control method generate a switch control signal through an input unit (such as a hardware switch or software), to control the recharging circuit inside a portable electronic device outputting recharging power to recharge rechargeable batteries. Therefore, when the rechargeable battery still contains sufficient energy so no recharge is required, the recharge function of the portable electronic device can be interrupted, therefore reducing unnecessary recharging times. Moreover, when the remaining energy of the rechargeable battery is low, the recharging apparatus and method claimed in the present invention detect said remaining energy and then compare the remaining energy with a predetermined threshold value. If the remaining energy is less than the threshold value, the recharging apparatus forces the recharging circuit to output recharging power for recharging the battery, thereby avoiding auto shutdown of the portable electronic device due to low energy. In short, utilizing the recharging apparatus and control method claimed in the present invention effectively reduces unnecessary recharging times and increases rechargeable battery life. Furthermore, convenience of the portable electronic device is maintained.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A recharging apparatus applied to a portable electronic device, selectively enables or interrupts recharging procedures for a rechargeable battery in the portable electronic device, the recharging apparatus comprising:

an input unit for generating a switching control signal according to an input signal created by a user of the recharging apparatus;

a recharging circuit for receiving an enable signal and then outputting a recharging power used for recharging the rechargeable battery;

a control unit, electrically connected to the input unit and the recharging circuit, for determining whether to output the enable signal to the recharging circuit in accordance with the switching control signal; and a battery energy measuring circuit electrically connected to the control unit, for measuring energy of the rechargeable battery to output a measure value to the control unit;

wherein the control unit outputs the enable signal to the recharging circuit regardless of a value of the switching control signal when the measure value is smaller than a threshold value.

2. The recharging apparatus of claim 1, wherein the control unit is a microprocessor of the portable electronic device.

3. The recharging apparatus of claim 1, wherein the input unit is software installed in the portable electronic device.

4. The recharging apparatus of claim 1, wherein the input unit is a switch positioned on the portable electronic device.

5. The recharging apparatus of claim 1, wherein the portable electronic device is a mobile phone or a notebook PC.

6. The recharging apparatus of claim 1, wherein the input unit is a battery energy measuring circuit, for measuring energy of the rechargeable battery and then determining whether to generate the switching control signal.

7. A recharging method applied to a portable electronic device, selectively enables or interrupts recharging procedures for a rechargeable battery in the portable electronic device, the recharging method comprising:

generating a switching control signal according to an input signal created by a user of the portable electronic device;

determining whether to output an enable signal to a recharging circuit in accordance with the switching control signal;

measuring energy of the rechargeable battery to output a measure value;

wherein the step of determining whether to output the enable signal to the recharging circuit in accordance with the switching control signal further comprises:

outputting the enable signal to the recharging circuit regardless of a value of the switching control signal when the measure value is smaller than a threshold value; and receiving the enable signal and then outputting a recharging power used for recharging the rechargeable battery.

8. The recharging method of claim 7, wherein the step of determining whether to output the enable signal to the recharging circuit in accordance with the switching control signal further comprises:

utilizing a microprocessor inside the portable electronic device to determine whether to output the enable signal.

9. The recharging method of claim 7, wherein the step of generating the switching control signal further comprises:

utilizing software installed in the portable electronic device to generate the switching control signal.

10. The recharging method of claim 7, wherein the step of generating the switching control signal further comprises:

utilizing a switch positioned on the portable electronic device to generate the switching control signal.

11. The recharging method of claim 7, being applied in a mobile phone or a notebook PC.

12. The recharging method of claim 7, wherein the step of generating the switching control signal further comprises: measuring energy of the rechargeable battery and then determining whether to generate the switching control signal.

* * * * *

UNITED STATES PATENT AND TRADEMARK OFFICE
CERTIFICATE OF CORRECTION

PATENT NO. : 7,589,503 B2  Page 1 of 1
APPLICATION NO. : 11/499707
DATED : September 15, 2009
INVENTOR(S) : Chin-Hsien Hsieh It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 373 days.

Signed and Sealed this

Twenty-first Day of September, 2010

David J. Kappos
*Director of the United States Patent and Trademark Office*